Jan. 5, 1960 H. R. HOCHSTADT ET AL 2,920,000
COLLAGEN ARTICLE AND THE MANUFACTURE THEREOF
Filed Oct. 22, 1958 4 Sheets-Sheet 4
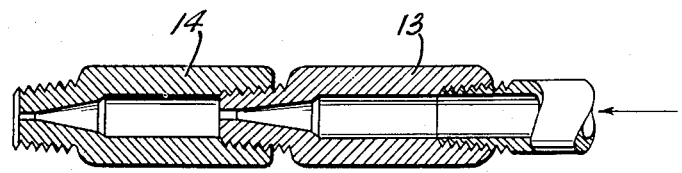
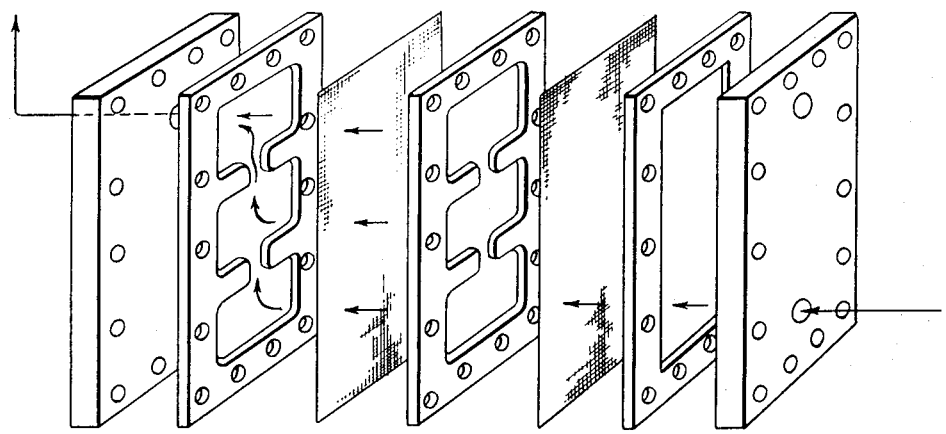
INVENTORS:
HAROLD R. HOCHSTADT
EMANUAL R. LIEBERMAN
BY
ATTORNEY United States Patent Office 2,920,000
Patented Jan. 5, 1960

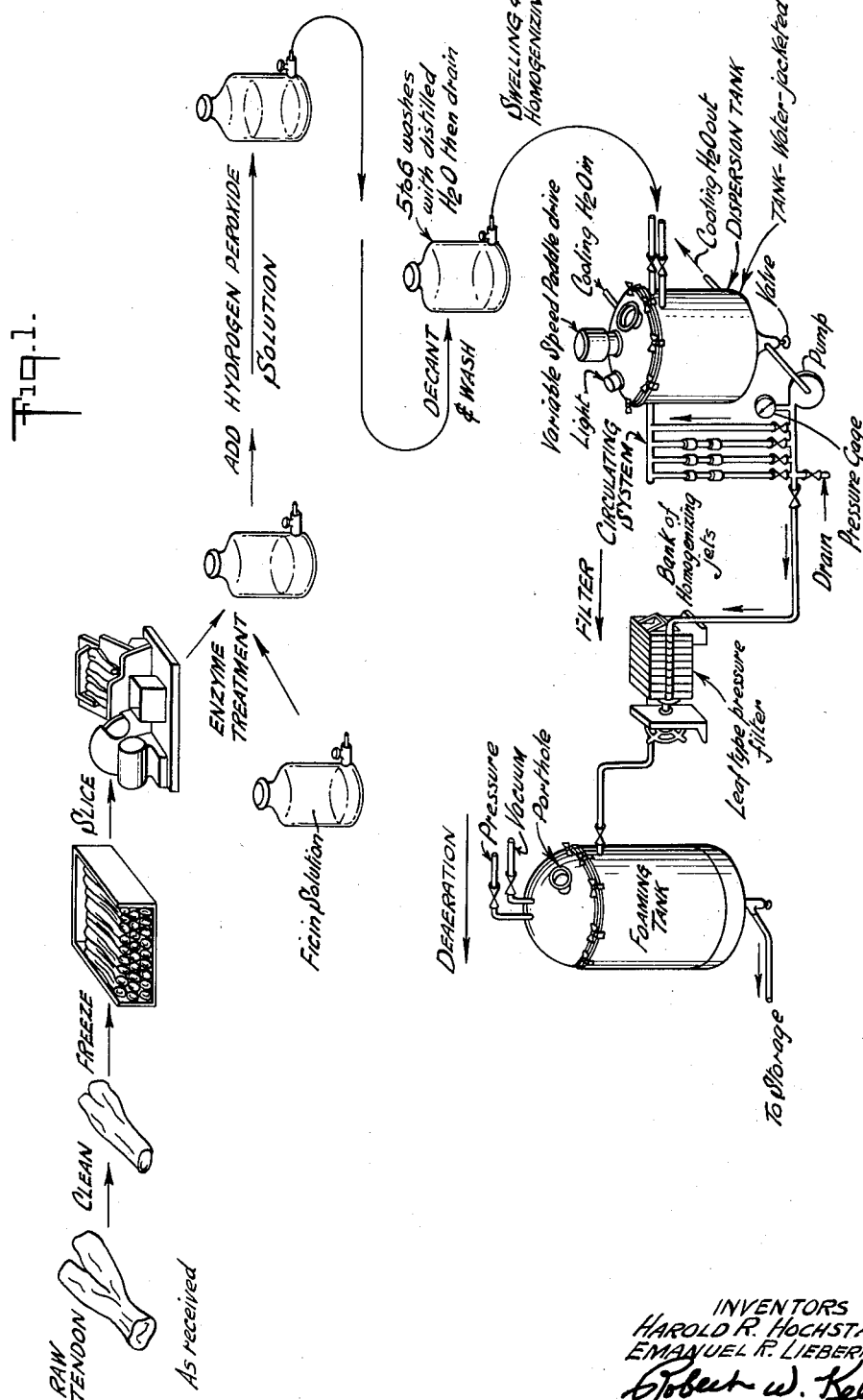

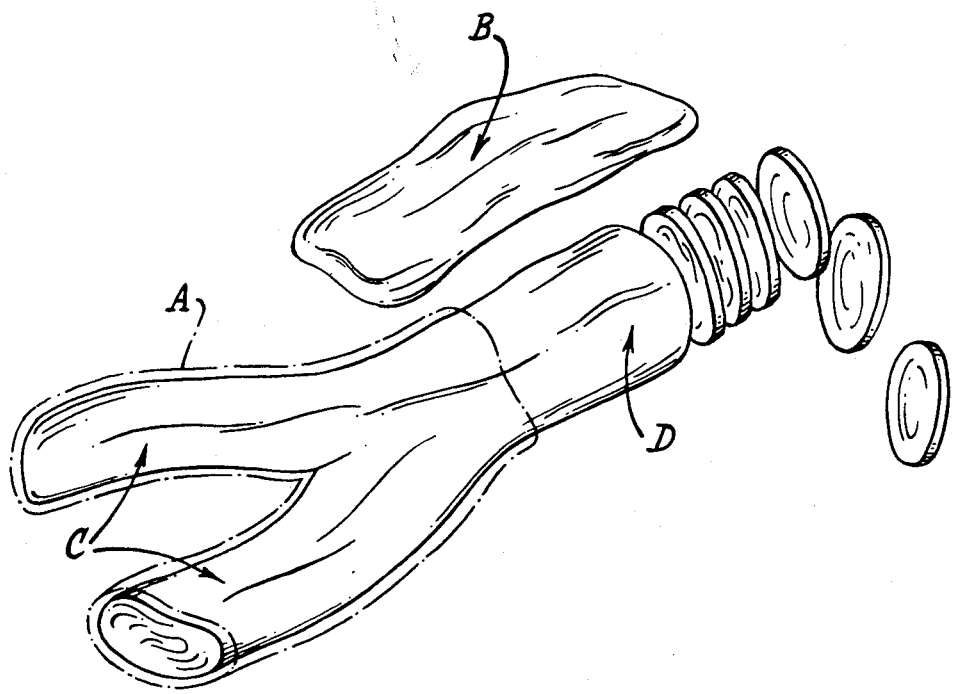

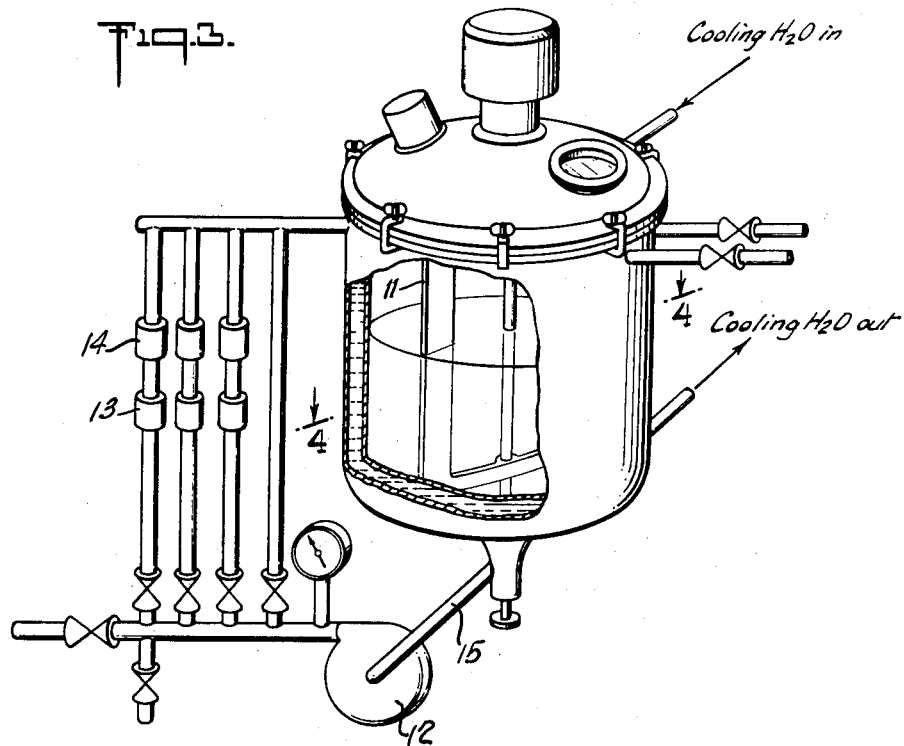
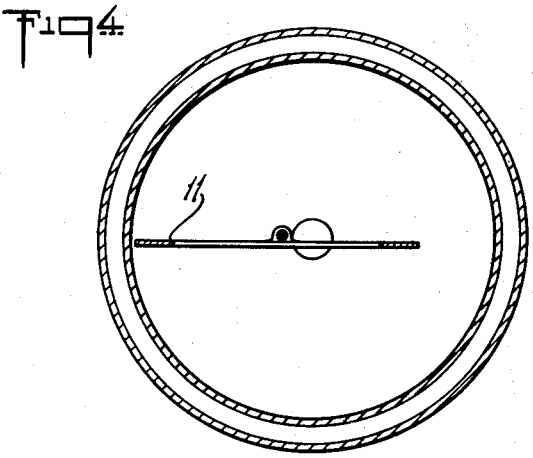

2,920,000
COLLAGEN ARTICLE AND THE MANUFACTURE THEREOF

Harold R. Hochstadt, Franklin Park, and Emanuel R. Lieberman, Somerville, N.J., assignors to Ethicon, Inc., a corporation of New Jersey Application October 22, 1958, Serial No. 768,979

5 Claims. (Cl. 106—161)

This invention relates to a dispersion of swollen collagen fibrils in an acid solution and to a process for obtaining such a dispersion. The collagen dispersions of the present invention are useful in the manufacture of absorbable sutures and surgical aids in the form of films, filaments, strands, tubing and sponges. Edible sausage casings have also been made from these collagen dispersions.

For the sake of clarity, the terms used herein are defined as follows:

The term "native collagen fiber," as used herein, means a thread-like collagen structure as it exists in connective tissue.

The term "swollen collagen fibril," as used herein, means a thread-like collagen structure that has been swollen in acid solution having a diameter of about 200 to 2000 Angstrom units.

The term "monofilament," as used herein, means a single thread of oriented collagen fibrils as extruded through a single orifice in a spinnerette.

The term "multifilament," as used herein, means a group of individual separate filaments extruded through a spinnerette.

The term "strand," as used herein, means a group of filaments that have been united to form a unitary structure.

The success of a process employing collagen as a basic material is often dependent upon maintaining the collagen fibril structure throughout the process. Denaturation or degradation of the collagen structure prior to or during the casting of a film, spinning of a monofilament, or extrusion of a shaped article, such as a ribbon or a tube, will impair desirable qualities of the fabricated article. Prevention of serious degradation during processing, however, has always been difficult because collagen in the native state is associated with impurities and must be separated therefrom. It has been a disadvantage of the prior art processes for the manufacture of a collagen dispersion that serious denaturation and degradation of the collagen results from the mechanical, thermal and chemical steps employed to separate the collagen from associated non-collagenous impurities.

It is an object of the present invention to separate collagen from connective tissue without changing the original collagen fibril structure.

It is another object of this invention to prepare a homogeneous dispersion of swollen undenatured and undegraded collagen fibrils.

It is also an object of this invention to prepare a dispersion of unprecipitated swollen collagen fibrils that maybe extruded into a dehydrating bath to form shaped articles of exceptional strength.

The objects of this invention may be realized by swelling and dispersing collagen fibrils in an aqueous solution of cyanoacetic acid. The aqueous solution of cyanoacetic acid may contain methanol as a cosolvent. One phase of the present invention relates to the observation that collagen fibrils, when swollen in aqueous cyanoacetic acid solution, are not degraded or denatured at temperatures below about 25° C. Thus, the swollen collagen fibrils may be dehydrated and processed to give multifilaments and strands of exceptional tensile strength.

The invention will appear more clearly from the following detailed description when taken in connection with the accompanying drawings, showing, by way of example, a preferred embodiment of the inventive idea.

Referring now to the drawings:

Figure 1 is a flow diagram illustrating the sequence of steps in preparing a dispersion of collagen fibrils from animal tendon.

Figure 2 is a drawing of the superficial flexor and deep flexor tendons as obtained from cattle and illustrates that portion of the tendon used in preparing the dispersion of the present invention.

Figure 3 is a sectional view of a kettle that is used to prepare a homogeneous dispersion of collagen fibrils and illustrates the associated circulating pump and homogenizing jets.

Figure 4 is a sectional view of the dispersion kettle on the line 4—4 of Figure 3.

Figure 5 is a detailed sectional view of two homogenization jets of the type that are used in the return line to the dispersion kettle.

Figure 6 is an exploded view of a screen filter of the type used to remove non-swollen material from the collagen dispersion.

The general sequence of operations in the formation of a dispersion of pure collagen fibrils is shown by the flow sheet appearing as Figure 1 in the accompanying drawings. By the process to be described, one may disperse the collagen fibrils and remove impurities therefrom without appreciable denaturation or degradation of the collagen structure.

The raw material for the dispersion of this invention is mammalian tendon. Whales are a large source of collagen, and whale tendon is a satisfactory starting material. Pork, sheep and beef tendons are also satisfactory. The best results to date have been obtained using the deep flexor tendon of cattle.

The various sections of bovine tendon are illustrated in Figure 2. In this figure, certain sections of the tendon have been arbitrarily designated by the letters "A" through "D." The "A" portions consist of sheaths (annular ligaments) which surround the two "C" sections. The "A" portions are also connected directly to the "B" tendon (the superficial flexor tendon). The "C" material consists of two small dense shanks which branch off the larger "D" section. These "C" portions (branches of the deep flexor tendon) contain a large percentage of material that does not swell in acid solutions. That section of the single shank identified by the letter "D" in Figure 2 (the deep flexor tendon) is the preferred portion of the tendon for preparing the collagen dispersion to be described, but the "B" portion may also be used.

With reference to Figure 1, the beef tendons (preferably deep flexor tendons), as shipped from the packing house and received, are frozen to prevent deterioration and must be thawed to permit cleaning the tendon of fat, superficial non-collagenous protein, and other extraneous matter. The cleaned tendon is then sliced to a thickness of about 11 to 25 mils. Thicker slices swell slowly in aqueous cyanoacetic acid solutions and are difficult to disperse. Thinner slices disperse readily but the dispersion, when extruded, has poor tensile strength. Preferably, the tendon slices are formed by cutting across the major axis as lengthwise slicing seems to result in a slower swelling. An aliquot sample of the sliced tendon is analyzed at this time for total solids as the moisture contained in the tendon received from various suppliers and at different times is not constant.

The sliced tendon is next treated with an enzyme solution to dissolve the elastin which encircles the native collagen fibers and ties them together. By this treatment substantially all of the elastin is dissolved and can be removed. Proteolytic enzymes from either plant or animal sources may be employed to advantage. Pancreatin is an enzyme that is effective in removing elastin. Enzymes derived from plants, such as ficin, are also useful. Another enzyme that will perform this function is one prepared by extracting commercial malt diastase (U.S.P. IX) with water. The tendon-enzyme mixture is stored at room temperature for 15 to 20 hours.

After the enzyme treatment, the tendon slices are washed with water. Soluble proteins and lipids may be removed by treating the slices with a dilute aqueous solution of a chelating agent, such as ethylenediamine tetrasodium tetraacetate. Following this treatment, the tendon slices are washed again to remove residual traces of the chelating agent.

The cleaned tendon slices at this point contain a high percentage of purified collagen associated with material that does not swell in acid solution. The next step is to swell this collagen in a cyanoacetic acid solution to form a homogeneous dispersion of collagen fibrils, but it is most important that during this step the individual slices of collagen not be permitted to coalesce. As collagen swells, it becomes sticky and, if the individual collagen sections are permitted to stick together, the interior of the conglomeration will not have contact with the swelling solution. Therefore, to obtain a homogeneous fiber dispersion in a practical time, it is most desirable to prevent coalescence of the individual tendon slices. A dispersion kettle (see Figures 3 and 4) having a paddle 11 positioned off center, as shown in the drawings, is used to minimize lump entanglement. In the dispersion kettle, the collagen slices are slowly stirred in the aqueous cyanoacetic acid solution. The collagen slices absorb the cyanoacetic acid solution with swelling.

Temperature becomes a critical factor after addition of acid to the tendon slices as the collagen is degraded in the presence of acids at about 30° C., and above. For this reason, all processing subsequent to the cyanoacetic acid addition should be carried out at temperatures below about 25° C.

The swelling solution is an aqueous solution of cyanoacetic acid containing about 0.25 gram mol of cyanoacetic acid for each 100 grams (dry weight) of collagen to be treated. Thus, an aqueous solution to swell 300 grams of tendon slices (33% solids) may be prepared by dissolving 21.26 grams (0.25 mol) of cyanoacetic acid in about 10 liters of water. As much as 50 percent of the water present in the swelling solution may be replaced with methanol. The use of methanol as a cosolvent facilitates the removal of air bubbles from the collagen dispersion. When methanol is used as a cosolvent, however, the amount of cyanoacetic acid is preferably increased. About twice the quantity of cyanoacetic acid, or 0.50 gram mol of cyanoacetic acid for each 100 grams (dry weight) of collagen should be used if the aqueous solution is about 50 percent methanol. In general, the swelling solution will contain from about 0.2 percent to about 0.5 percent cyanoacetic acid. Less cyanoacetic acid retards swelling and increasing the amount of cyanoacetic acid beyond 0.5 percent does not appreciably decrease the swelling time or improve the dispersion. The preferred pH is 2-3.

It is very difficult to prepare a collagen dispersion containing more than 2 percent collagen as more concentrated dispersions have an extremely high viscosity. When the collagen dispersion is to be used in spinning processes, the amount of tendon present in the swelling solution is preferably about 1 percent. A dispersion of collagen fibrils that has a solids content below about 0.8 percent is difficult to spin. On the other hand, a concentration of collagen fibrils greater than 1 percent results in a dispersion that is more difficult to extrude. Of equal importance is the difficulty in obtaining and maintaining a homogeneous dispersion when the total solids are too high. It is extremely important that a collagen fibril dispersion which is to be extruded be homogeneous, as a small change in the solids concentration of the material being extruded will result in large cross-sectional variations in the final product.

After most of the swelling has taken place in the dispersion kettle (Figure 3), the dispersion is homogenized by repeated passes through a stainless steel rotary metering pump 12 and stainless steel series-connected jets 13 and 14 having orifices of about 50 mils and 40 mils, respectively. The internal structure of these jets is illustrated by Figure 5. It will be noted from Figure 3 that these jets are positioned in parallel banks. This readily permits isolating any pair of jets from the system for cleaning.

Stirring is continued during homogenization. Best results are obtained with a slow agitation (60 r.p.m.) during the swelling stage, intermittent agitation (60 r.p.m.) at the beginning of homogenization, and higher speed (120 r.p.m.) intermittent agitation near the end of the homogenization.

The homogenizing pump 12 employed in this process is a rotary pump (such as a Zenith pump) that has been modified by milling about 0.003 inch from the circumference of the gear teeth. The intake and exit from the pump are connected to the dispersion kettle by the stainless steel conduit 15 which is capable of withstanding the high pressure.

The homogenizing pump is operated at 190 r.p.m. for two to four hours. The flow rate through the homogenizing jets at the start of this step is irregular and the pressure on the gauge 16 may rise above 200 pounds per square inch. Toward the end of the homogenization step, however, the pressure between the pump and the 50-mil jet 13 is relatively constant at 60 to 80 pounds per square inch.

The dispersion after homogenization still contains fibers of unswollen non-collagenous material which must be removed. This is most readily accomplished by forcing the dispersion under pressure through a leaf filter which retains the unswollen non-collagenous material.

Figure 6 is an exploded view of a leaf filter which may be expanded to include any desired number of screens. A suitable filter may contain three or more screens of #316 stainless steel. These screens are separated by ⅛-inch spacers and decrease in mesh size so that the swollen collagen first passes a 15-mil screen, then a 9-mil screen and finally a 4-mil screen. During the filtration step, the speed of the pump may be varied as necessary to maintain the pressure on the filter below about forty pounds per square inch at all times. Pressures above fifty pounds per square inch may force the non-collagenous impurities into the filtered dispersion.

The dispersion of collagen fibrils after filtration may be deaerated under vacuum and is then ready for storage. If stored at 5° C., or below, the dispersion will remain substantially unchanged for periods in excess of two or three weeks.

Throughout the specification and the examples which follow, all quantities are expressed in parts by weight, unless otherwise indicated.

*Example I*

That portion of the deep flexor tendon of cattle designated in Figure 2 as the "D" section, is cleaned of fat, superficial non-collagenous protein, and other extraneous matter and is sliced on an electric meat-slicing machine (rotary knife) in the frozen condition. The tendon sections are sliced perpendicularly to their longitudinal axis to a thickness of about 11 mils. An aliquot sample of the tendon slices is analyzed; the dry solids amount to 36.97%.

The sliced tendon is next treated with an enzyme solution to dissolve elastin. The enzyme solution is prepared by dissolving 0.15 part of ficin and 3.75 parts of ethylenediamine tetrasodium tetraacetate in 750 parts of water. Seventy-five parts of the sliced tendon is immersed in this solution which is stored at room temperature overnight. Then, 2.25 parts of 30% hydrogen peroxide is added to destroy any residual ficin.

To this mixture of tendon slices in about 750 parts of water is added an additional 2244 parts of water and 5.87 parts of cyanoacetic acid. The swelling solution is cooled to below 25° C. This mixture is stirred in the dispersion kettle illustrated in Figure 3 at about 60 r.p.m. It is important that the remaining steps in the process be carried out at temperatures below about 25° C., and that the temperature of the collagen dispersion not be allowed to exceed this temperature.

Stirring is continued for about 3 hours, during which time the individual collagen slices are swollen. The dispersion is then homogenized by repeated passes through the stainless steel rotary metering pump 12, as described above, and the stainless steel series-connected jets (13 and 14) having orifices of 50 mils and 40 mils, respectively. During the homogenization, the stirrer in the dispersion kettle is operated intermittently.

The pressure on the high pressure side of the homogenization jets falls to 70 pounds per square inch and remains constant after 3.5 hours, indicating substantially complete homogenization. The dispersion is then forced through a leaf filter containing three screens of #316 stainless steel. These screens are separated by ⅛-inch spacers and decrease in mesh size so that the dispersion first passes a 14-mil screen, then a 9-mil screen, and finally a 4-mil screen. During the filtration step, the pressure on the filter is maintained below about 40 pounds per square inch at all times.

The dispersion of solvated collagen fibrils so obtained analyzes 1.09% solids and has a pH of 2.52.

The dispersion may be dehydrated under mild conditions to recover highly purified collagen fibers or may be deaerated and then extruded through a spinnerette into an acetone dehydrating bath to form collagen filaments, edible sausage casings, and other shaped articles of exceptional strength.

The multifilament so obtained is stretched, twisted, tanned and then again stretched and twisted to coalesce the multifilaments and form a self-bonded unitary strand. The strand, after sterilization, has the following properties:

|  | Grams per denier |
| --- | --- |
| Dry straight tensile strength | 2.80 |
| Dry knot tensile strength | 2.09 |
| Wet knot tensile strength | 1.81 |

The papain digestion time of this strand is 4.1. This is the time in hours required for a 7-inch strand tied to form a loop to go to 20 grams strength at 38° C., in a solution of papain containing 3 grams of the enzyme in 100 milliliters of a buffered solution containing 7.6 grams of thiourea. Four milliliters of 5% sodium cyanide are added to 96 milliliters of the above buffered solution of papain just prior to use.

The hot water digestion time of this strand is 8.9. This is the time, in minutes, required for a 7-inch strand, tied to form a loop, to go to 20 grams strength at 100° C. when immersed in a solution of water buffered at a pH of 1.35.

Surgical sponges may be made by freeze drying the collagen dispersion of this example. The collagen dispersion may also be extruded through an annular orifice into a dehydrating bath to form tubular shapes. Such collagen tubes are washed, and tanned to give edible products suitable for sausage casings.

*Example II*

Fifteen hundred parts of "D" tendon slices, cleaned and sliced as described in Example I to a thickness of 23 mils, are treated with 15,000 parts of an aqueous solution containing 15 parts (0.1%) of ficin, 3.63 parts of disodium ethylenediamine tetraacetic acid and 1.95 parts of ethylenediamine tetrasodium tetraacetic acid. The tendon slices, prior to enzyme treatment, analyze 36.9% solids. After standing for 17 hours at room temperature, the enzyme solution is decanted and a swelling solution containing 50 parts of 30% hydrogen peroxide solution in 15,000 parts of water is added to the slices. The solution is decanted from the tendon slices after 30 minutes and the slices are rinsed with water. The weight of the water of hydration amounts to 5890.5 parts.

A swelling solution is prepared by adding 235.2 parts (2.76 mols) of cyanoacetic acid to a mixture of 30,473 parts of methanol and 24,576 parts of water and stirring. The enzyme treated slices are added to the acid solution in the dispersion kettle illustrated in Figure 3, and agitated for 1 hour at 60 r.p.m. This dispersion is calculated to contain 0.9% collagen, 0.38% cyanoacetic acid, and equal amounts of water and methanol.

The dispersion is homogenized by repeated passes through a ½-inch pipe. It is then pumped through a ⅛-inch jet and the dispersion is next circulated through a 60-mil jet for about 15 minutes, finally passing through a leaf filter containing 15-, 9- and 5.5-mil screens.

The deaerated dispersion contains 0.86% solids. This dispersion of solvated collagen fabrils is extruded through a spinnerette into a dehydrating bath. The multifilament so obtained is tanned with chromium, stretched, twisted, washed with water, and then stretched and twisted again to coalesce the multifilament and form a self-bonded unitary strand. The strand (270 denier), after sterilization, has the following properties:

|  | Grams per denier |
| --- | --- |
| Dry straight tensile strength | 4.14 |
| Dry knot tensile strength | 2.09 |
| Wet knot tensile strength | 1.92 |

The papain digestion time is 2.9, and the hot water digestion time is 8.4.

*Example III*

Fifteen hundred parts of "D" tendon slices, cleaned and sliced as described in Example I to a thickness of 23 mils are treated with 15,000 parts of an aqueous solution containing 15 parts (0.1%) of ficin, 3.63 parts of disodium ethylenediamine tetraacetic acid and 1.95 parts of ethylenediamine tetrasodium tetraacetic acid. The tendon slices, prior to enzyme treatment, analyze 37.3% solids. After standing for 17 hours at room temperature, the enzyme solution is decanted and a solution containing 50 parts of 30% hydrogen peroxide in 15,000 parts of water is added to the slices. The solution is decanted from the tendon after 30 minutes and the slices are rinsed with water. The weight of the water of hydration amounts to 4040.5 parts.

A swelling solution is prepared by adding 237.8 parts (2.78 mols) of cyanoacetic acid to a mixture of 31,870.3 parts of methanol and 27,829.8 parts of water and stirring. The enzyme treated slices are added to the acid solution in the dispersion kettle illustrated in Figure 3, and the mixture is agitated for 1 hour at 60 r.p.m. This dispersion is calculated to contain 0.87% collagen, 0.37% cyanoacetic acid and equal amounts of water and methanol.

The dispersion is homogenized by repeated passes through a ½-inch pipe. It is then pumped through five ⅛-inch jets in parallel, the dispersion is next circulated through five 60-mil jets in parallel for about 15 minutes, and is finally filtered through 15-, 9- and 5.5-mil screens.

The dispersion of collagen fibrils so obtained is deaerated, and then extruded through a spinnerette into an acetone dehydrating bath. The multifilament thus produced is tanned with chromium, stretched, twisted, washed with water and then twisted and stretched again. The final product is a dry self-bonded unitary strand (denier 245). This strand, after sterilization, has the following properties:

| | Grams per denier |
|---|---|
| Dry straight tensile strength | 4.50 |
| Dry knot tensile strength | 2.11 |
| Wet knot tensile strength | 1.96 |

The papain digestion time is 2.7, and the hot water digestion time is 8.2.

*Example IV*

Twenty-four hundred parts of cleaned tendon of the type described in Example I sliced to a thickness of 23 mils are treated with 24,000 parts of an aqueous solution containing 24 parts (0.1%) ficin and 9.98 parts (0.001 M) of ethylenediamine tetrasodium tetraacetate. The tendon slices analyze 37.1% total solids, equivalent to 890.4 parts on a dry weight basis. The pH of the enzyme solution is 6.2. After standing for 17 hours at room temperature, the enzyme solution is decanted and the tendon slices are stirred with 24,000 parts of water containing 80 parts of 30% hydrogen peroxide. The hydrogen peroxide solution is drained off and the tendon slices are added to an aqueous methanol solution of cyanoacetic acid made up by adding 51,354.8 parts of methanol and 378 parts of cyanoacetic acid to 49,085.2 parts of water. The amount of cyanoacetic acid in this solution is equivalent to 0.5 mole of acid for each 100 parts of dry solids and the tendon solids amount to 0.86% by weight of the total mixture. The tendon slices are agitated with this acid aqueous methanol mixture for 3 hours at 80 r.p.m. with cooling. The mixture is then circulated through a ½-inch pipe for 1 hour, through ⅛-inch jets for another hour, and through 60-mil jets for ½ hour. The dispersion is then filtered through a leaf filter containing 15-, 9- and 5.5-mil screens and deaerated under vacuum. The pH of this dispersion is about 2.8.

The dispersion is spun into an acetone dehydrating bath, and the extruded filaments are tanned with a chromium tanning solution, stretched, twisted and tanned with formaldehyde.

Ten feet of the product spun by this method weighs 85 milligrams (250 denier). The strand of this example, when sterilized, has the following physical characteristics:

| Dry Straight | Dry Knot | Wet Knot | Papain Digestion | Hot Water Digestion |
|---|---|---|---|---|
| 2.20 | 1.29 | 1.26 | 2.4 | 7.3 |
| 2.15 | 1.27 | 1.17 | 2.6 | 7.3 |
| 2.22 | 1.14 | 1.23 | 2.5 | 7.3 |
| 2.26 | 1.03 | 1.27 | | |
| 2.19 | 1.01 | 1.31 | | |
| 2.10 | 1.14 | 1.12 | | |
| 2.07 | 1.17 | 1.24 | | |

From the above table, it may be calculated that the average dry straight tensile strength is 2.18 pounds. The average dry knot tensile strength is 1.15 pounds. The average wet knot tensile strength is 1.23 pounds. These values correspond to a dry straight tensile strength of 4.00 grams per denier, a dry knot tensile strength of 2.12 grams per denier, and a wet knot tensile strength of 2.26 grams per denier. The strand of this example is very uniform in diameter, the diameter of 10 random samples being 6.1, 6.5, 6.6, 6.5, 6.6, 6.5, 6.6, 6.5, 6.7, 6.6 mils.

*Example V*

Twenty-four hundred parts of the tendon described in Example I are sliced to a thickness of 23 mils. This is equivalent to 885.6 parts of tendon solids (36.9%). The tendon slices are treated with 24,000 parts of an aqueous solution containing 24 parts of ficin and 9.98 parts (0.001 M) of ethylenediamine tetrasodium tetraacetate. The mixture is permitted to stand overnight at 24° C. The enzyme solution is then removed by decantation and the enzyme treated slices are agitated with 24,000 parts of water containing 80 parts of 30% hydrogen peroxide. After ½ hour, the hydrogen peroxide solution is drained from the enzyme treated slices and the slices are added to a solution of cyanoacetic acid containing 376.4 parts of cyanoacetic acid in 48,701.1 parts of water and 51,045.5 parts of methanol. The mixture is agitated for 3 hours at 80 r.p.m. and is then circulated for 1 hour through a ½-inch pipe. The dispersion is circulated for another hour through a ⅛-inch jet and the homogenization is completely accomplished by circulating an additional ½ hour through a 60-mil jet. This dispersion is filtered under pressure of 40 pounds per square inch through a leaf filter containing 15-, 9- and 5.5-mil screens and deaerated under vacuum.

The collagen dispersion (0.86% solids) is aged for 144 hours at room temperature and spun by the process described in the preceding example. The product (250 denier) tested sterile as follows:

| Dry Straight | Dry Knot | Wet Knot | Papain Digestion | Hot Water Digestion |
|---|---|---|---|---|
| 2.24 | 1.27 | 1.00 | 3.8 | 6.2 |
| 2.42 | 1.37 | 1.06 | 3.8 | 6.5 |
| 2.39 | 1.37 | 1.00 | 3.8 | 6.0 |
| 2.34 | 1.37 | 1.17 | | |
| 2.38 | 1.14 | 1.19 | | |
| 2.37 | 1.51 | 1.12 | | |
| 2.16 | 1.75 | 1.06 | | |
| | 1.78 | | | |

From the above table, it may be calculated that the average dry straight tensile strength is 2.33 pounds. The average dry knot tensile strength is 1.48 pounds. The average wet knot tensile strength is 1.09 pounds. These values correspond to a dry straight tensile strength of 4.23 grams per denier, a dry knot tensile strength of 2.68 grams per denier, and a wet knot tensile strength of 1.98 grams per denier. The strand of this example is very uniform in diameter, the diameter of 10 random samples being 6.2, 6.2, 6.1, 6.4, 6.4, 6.2, 6.3, 6.4, 6.2 and 6.3 mils.

It is an advantage of the dispersion of this invention that even minute air bubbles, which would cause breaks when the dispersion is extruded to form filaments, may be easily removed under vacuum. The aqueous methanol cyanoacetic acid dispersions may be completely deaerated at 15 mm. of mercury within 2 or 3 hours.

The mechanical spinning of collagen dispersions to form a suture material is described and claimed in co-pending application Serial No. 768,969, filed October 22, 1958.

While the invention has been described in detail according to the preferred manner of carrying out the process and yielding the products, it will be obvious to those skilled in the art, after understanding the invention, that changes and modifications may be made therein without departing from the spirit or scope of the invention, and it is intended in the appended claims to cover all such changes and modifications.

What is claimed is:

1. A dispersion of swollen undegraded collagen fibers in a dispersant consisting essentially of an aqueous solution of cyanoacetic acid.

2. A dispersion of swollen undegraded collagen fibers in a dispersant consisting essentially of an aqueous methanol solution of cyanoacetic acid, said methanol amounting to about 50% of the total weight of the dispersant.

3. A dispersion of swollen undegraded collagen fibers in a dispersant consisting essentially of an aqueous methanol solution of cyanoacetic acid, said methanol amounting to about 50% of the total weight of the dispersant, and said cyanoacetic acid amounting to between about 0.2% and about 0.5% of the total weight of the dispersant.

4. In a process for the extrusion of a homogeneous collagen dispersion to form a shaped article, the improvement which comprises swelling and dispersing collagen fibers derived from animal tendons in an aqueous solution of cyanoacetic acid.

5. In a process for the extrusion of a homogeneous collagen dispersion to form a shaped article, the improvement which comprises swelling and dispersing collagen fibers derived from animal tendons in an aqueous methanol solution of cyanoacetic acid while maintaining the temperature below about 25° C., said methanol amounting to about 50% of the total weight of the aqueous methanol solution.

References Cited in the file of this patent

UNITED STATES PATENTS

| | | |
|---|---|---|
| 2,622,036 | Alexander et al. | Dec. 16, 1952 |
| 2,631,942 | Highberger | Mar. 17, 1953 |
| 2,838,363 | Veis et al. | June 10, 1958 |